United States Patent Office 3,655,806
Patented Apr. 11, 1972

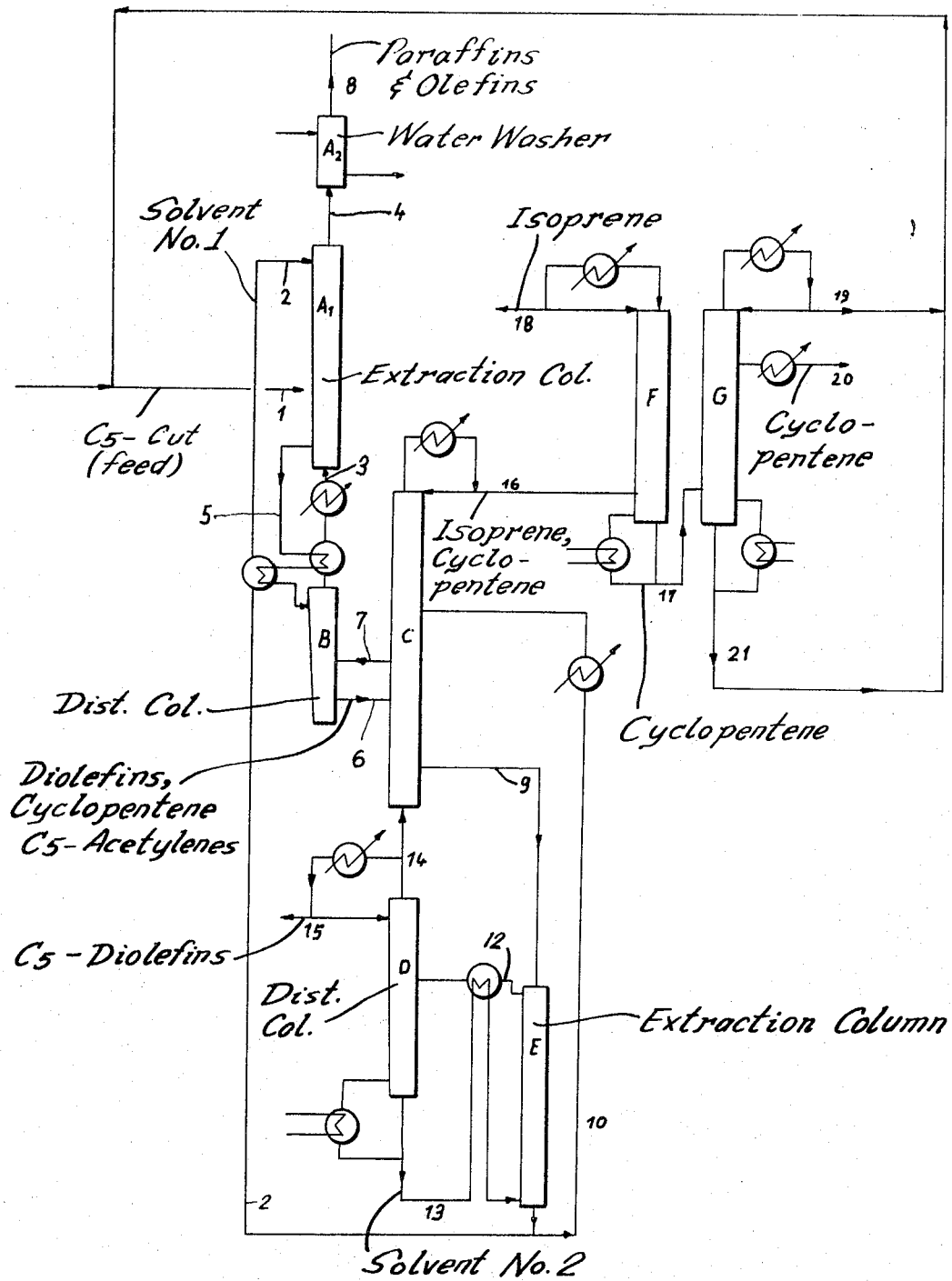

3,655,806
C$_5$-HYDROCARBON MIXTURES SUBJECTED TO LIQUID-LIQUID EXTRACTIONS AND EXTRACTIVE DISTILLATION USING PLURAL SOLVENT SYSTEMS
Hans-Walther Brandt, Cologne-Flittard, Bruno Engelhard, Cologne-Stammheim, Heinrich Steude, Leverkusen, Helmut Scherb, Sinnersdorf, and Bernhard Schleppinghoff and Gunther Schnuchel, Dormagen, Germany, assignors to Farbenfabriken Bayer Aktiengesellschaft, Leverkusen, and Erdolchemie Gesellschaft mit Beschrankter Haftung, Cologne, Germany
Filed Aug. 20, 1969, Ser. No. 851,587
Claims priority, application Germany, Aug. 24, 1968, P 17 93 273.9
Int. Cl. B01d 3/34
U.S. Cl. 260—681.5
8 Claims

ABSTRACT OF THE DISCLOSURE

Process of separating C$_5$-hydrocarbon mixtures containing C$_5$ paraffins and C$_5$ diolefins. The mixture is subjected to a first liquid-liquid extraction with a solvent selective for the diolefins. The resulting solvent laden with diolefins is subjected to an extractive distillation in which some of the diolefins are removed leaving an extractive distillation liquid effluent laden with some of the diolefins. The last mentioned liquid effluent is subjected to a second liquid-liquid extraction in which a second solvent extracts therefrom the diolefins, yielding the first solvent in condition for recycling to the first liquid-liquid extraction. Diolefins are then distilled from the second solvent. Thus, the first solvent need not be subjected to extensive distillation, so that the first solvent need not be highly resistant to heating.

---

It is known that C$_5$-hydrocarbon cuts of the kind obtained for example by cracking petroleum can be split up by treatment with selective solvents generally with the assistance of one or more extractive distillations. To this end, the C$_5$-feed mixture consisting of paraffins, olefins asd diolefins is delivered to the extractive distillation process in the gas phase. The solvent becomes laden with the diolefins, whilst the paraffins and olefins are removed from the head of the column substantially free from diolefins. As the solvent continues to be degassed, the various substances can be recovered as pure components depending upon the degree of selectivity (for example isoprene, cyclopentane, 1,3 - pentadiene and cyclopentadiene). A hydrocarbon-free solvent is run off from the sump, some of which to be purified in a subsequent regeneration of the high-boiling compounds.

Both in the gas separator and during regeneration, the usually high-boiling and thermally unstable solvents are subjected to considerable thermal stressing, as a result of which appreciable losses are incurred through decomposition of the solvents, some of which are extremely expensive, quite apart from the impurities caused by decomposition products in the hydrocarbon streams.

Various attempts have been made to avoid the high temperatures. Although the addition of water to the solvents increases their selectivity, its use is limited by the solubility of the hydrocarbons in the solvent which decreases with increasing water content, so that the addition of from 5% to a maximum of 10% of water does not have an adequate effect upon the boiling point.

Removal of gases from the solvents both during extractive distillation and after liquid-liquid extraction in vacuo involves considerable expense because the condensation temperatures of the hydrocarbons fall below the usual cooling water temperatures, with the result that cooling with brine is necessary.

We have now found that the aforementioned disadvantages can be avoided provided the separation of a C$_5$-hydrocarbon mixture containing cyclic, branched and normal paraffins, olefins and diolefins is carried out in a liquid-liquid extraction in conjunction with an extractive distillation with a selective solvent in such a way that the selective solvent is separated from the C$_5$-diolefins in a liquid-liquid counter-extraction with a second solvent and some of the C$_5$-hydrocarbon vapours obtained at the head of a distillation column for separating the second solvent from the diolefins are used to operate the extractive distillation. The second solvent can be a paraffin hydrocarbon boiling at temperatures some 30° C. to 40° C. higher than the C$_5$-diolefins which can readily be separated from the C$_5$-hydrocarbons in a normal distillation.

In this way, it is possible to use solvents which though thermally unstable show outstanding separation properties and it is also possible to carry out the separation of the C$_5$-hydrocarbons much more favourably in terms of energy required than was possible with hitherto conventional processes.

The following are examples of solvent suitable for use in the process according to the invention:

Solvent 1:
    (a) N-methyloxazolidone (n-methyl-2-oxazolidone) and
    (b) 1-oxo-1-methylphospholine Solvent 2:
    (a) hexane and
    (b) heptane The C$_5$-starting mixture for the process according to the invention generally consists of about 50% by weight of pentanes and pentenes, the remainder essentially containing diolefins.

The process according to the invention is now described with reference to the accompanying drawing:

The C$_5$-mixture is delivered in the liquid phase through a pipe 1 into the lower third of an extraction column A$_1$. The solvent is run in at the upper end of the column A$_1$, through a pipe 2. The lower part of the column A$_1$ is used for a rectifying extraction to which a diolefin stream is delivered from a column B through a pipe 3. The raffinate, consisting of paraffins, olefins and small quantities of diolefins, flows through a pipe 4 to a water washer A$_2$ where any residual traces of solvent are washed out, and is then removed at 8. The solvent laden with diolefins and to a limited extent with pentenes leaves the column A$_1$ through a pipe 5. This stream is heated by the streams 2 and 3 and delivered to the head of the distillation column B. At the lower end of the column B which is a side column for the column C, the solvent laden only with diolefins, cyclopentene and C$_5$-acetylenes is delivered through a pipe 6 to the middle of the column C. At the same place, some of the hydrocarbon vapours are taken from the column C through a pipe 7 to column B. The mixture leaving the head of the column B in the form of a gas is liquefied in counter-current to the stream 5 and is then cooled to the extraction temperature in the column A$_1$. A pure isoprene-cyclopentene mixture is removed from the head of column C and is delivered through a pipe 16 to a column F. Polymerisable isoprene is drawn off from the upper end of the column F at 18 and a mixture rich in cyclopentene is delivered from the sump through a pipe 17 to a column G. Polymerisable cyclopentene is removed through a side stream 20 from the column G. The head and bottom products of the column G are recycled to the inlet 1 to the column A$_1$.

The residual dienes together with the solvent are delivered from the bottom of column C through a pipe 9 to a countercurrent extraction column E. The second solvent used for this purpose is a paraffin hydrocarbon

(13) which boils at a temperature at least 30° C. higher than the $C_5$-diolefins, for example n-heptane. As raffinate or heavy phase, the solvent (1) leaves column E at its lower end free from hydrocarbons, except for 1 to 2% of n-heptane and is delivered through the pipe 2 to the extraction column $A_1$ and recycled through the pipe 10 to the head of the column C.

The extract, comprising the solvent 2 and $C_5$-diolefins, flows at 12 into the column D and is separated by straightforward distillation, some of the $C_5$-vapour being delivered through a pipe 14 to the column C, whilst the rest, condensed, is removed through a pipe 15.

EXAMPLE 7350 cc./hour of a $C_5$-hydrocarbon cut containing about 67.5% of pentane and pentene, 2% of cyclopentene, 13.5% of isoprene and 17% of residual diolefins are delivered in the liquid phase to the 20th plate of a pulsating sieve-plate column $A_1$ (35 mm. diameter) with 80 plates. This liquid-liquid extraction takes place at 15° C./760 torr. The feed rate of 1-oxo-1-methylphospholine containing 2% by weight of water, which is used as the selective solvent, to the 80th plate of the column amounts to 8500 cc./hour. The head of the column is followed by a water-washing column with 10 sieve plates. The hydrocarbon-laden solvent running off at the lower end is delivered at the head to the 40th plate of an 80 mm. diameter laboratory plate column (side column B). The pressure at the head of this column is 760 torr. At the lower end of the side column B, the stream of solvent laden with diolefins flows through a pipe 6 to the 70th plate of the column C (laboratory plate column 80 mm. in diameter with one bubble-cap/head pressure of 760 torr). At the 90th plate, a stream of solvent, again 1-oxo-1-methylphospholine containing 2% by weight of water, flows at 13,000 cc./hour and 40° C. to the 5th plate from the head of the column C. The reflux ratio $R/E$ (liquid reflux to liquid hydrocarbon removed) amounts to 7. These are removed as head product 1060 cc./hour of an isoprene/cyclopentene mixture which is split up into polymerisable isoprene and cyclopentene in columns F and G (laboratory plate-column out of glass with 50 mm. in diameter and 50 plates). At the lower end of the column C, the entire solvent containing about 25% of hydrocarbons flows through the pipe 8 to the extraction stage E (pulsating sieve-plate column 50 mm. in diameter with 60 plates (—20° C.). In the liquid-liquid countercurrent extraction, the $C_5$-hydrocarbons are dissolved out of the 1-oxo-1-methylphospholine with 16,000 cc./hour of n-heptane. The 1-oxo-1-methylphospholine runs off at the lower end of column E with a residual n-heptane content of around 2% and returns through the pipes 2 and 10 to the column $A_1$ and to the head of the column C. In column D, an 80 mm. diameter 50-plate laboratory plate column, the n-heptane is removed at the sump and 1150 cc./hour of $C_5$-diolefins at the head. The residual dienes are recycled in the vapour phase to the lower end of the column C. The reflux ratio $R/E$ amounts to 18.5 and at 820 torr the head pressure of D corresponds to the sump pressure of the column C.

What we claim is:

1. In a process for splitting up a $C_5$-hydrocarbon mixture containing $C_5$ paraffins and $C_5$-diolefins wherein:
   (a) said mixture is subject to a liquid-liquid extraction with a first portion of a first solvent selective for the diolefins producing an effluent of solvent laden with diolefins,
   (b) solvent laden with diolefins is subjected to an extractive distillation employing a second portion of said first solvent for extraction, and in which a portion of the diolefin content of the laden solvent is removed therefrom, producing an extractive distillation liquid effluent laden with the remaining diolefins, and
   (c) the extractive distillation liquid effluent is treated to separate therefrom diolefins and produce the solvent in condition for use in the liquid-liquid extraction of step (a), the improvement of performing said treating of the extractive distillation effluent by steps comprising:
   (d) subjecting the extractive distillation liquid effluent to a regeneration liquid-liquid extraction wherein the extractive distillation liquid effluent is contacted with a second solvent to produce a first regeneration effluent of second solvent laden with diolefins, and a second regeneration effluent of first solvent poor in diolefins,
   (e) employing said second regeneration effluent of first solvent poor in olefins as said first solvent in steps (a) and (b),
   (f) distilling diolefins from said first regeneration effluent, producing overhead diolefin vapor, and
   (g) introducing a part of said vapor into said extractive distillation for the distillation of the extractive distillation.

2. A process as claimed in claim 1, wherein the second solvent is a paraffin hydrocarbon boiling at a temperature from 30° C. to 40° C. above the $C_5$-hydrocarbons.

3. A process as claimed in claim 1, wherein said second regeneration effluent (step (d)) is used as such in step (a).

4. A process according to claim 1, wherein:
   said $C_5$-hydrocarbon mixture includes cyclic branched and normal paraffins, olefins including cyclopentene, isoprene and other diolefins,
   in step (a), paraffins and olefins are separated from the mixture and cyclopentene, isoprene and said other olefins are taken up by said first solvent forming said effluent laden with diolefins,
   in step (b), cyclopentene and isoprene are separated from said effluent laden with diolefins, and the extractive distillation effluent is laden with said other diolefins as said remaining diolefins.

5. Process according to claim 1, said first solvent comprising n-methyl-2-oxazolidone, or 1-oxo-1-methylphospholine, said second solvent comprising hexane or heptane.

6. Process according to claim 4, said first solvent comprising n-methyl-2-oxazolidone, or 1-oxo-1-methylphospholine, said second solvent comprising hexane or heptane.

7. Process according to claim 1, said first solvent comprising 1-oxo-1-methylphospholine, and said second solvent comprising n-heptane.

8. Process according to claim 1, said first solvent comprising 1-oxo-1-methylphospholine, and said second solvent comprising n-heptane.

References Cited

UNITED STATES PATENTS

| 2,840,511 | 6/1958 | Rylander et al. | 208—326 |
| 2,925,452 | 2/1960 | Braughton | 260—681.5 |
| 2,932,675 | 4/1960 | Steele et al. | 208—326 |
| 3,120,487 | 2/1964 | Norton et al. | 208—326 |
| 3,201,492 | 8/1965 | Sherk | 260—681.5 |
| 3,230,157 | 1/1966 | Hill et al. | 260—681.5 |
| 3,344,198 | 9/1967 | Weitz et al. | 260—681.5 |
| 3,345,287 | 10/1967 | Voetter et al. | 208—325 |
| 3,436,437 | 4/1969 | Asaka et al. | 260—681.5 |
| 3,510,405 | 5/1970 | Takao et al. | 260—681.5 |

WILBUR L. BASCOMB, JR., Primary Examiner

U.S. Cl. X.R.

203—43, 58, 70, 84; 208—325, 326; 260—676 R